(12) United States Patent
Bianchi et al.

(10) Patent No.: US 6,333,018 B2
(45) Date of Patent: Dec. 25, 2001

(54) PROCESS FOR THE INDUSTRIAL PRODUCTION OF HIGH PURITY HYDROGEN PEROXIDE

(76) Inventors: Ugo Piero Bianchi, Via Prato Santo 26, Verona; Umberto Leone, Largo Palizze 7 - Sulmona; Mauro Lucci, Via Monte Santo 75/C - Sulmona, both of L'Aquila, all of (IT)

( * ) Notice: Subject to any disclaimer, the term of this patent is extended or adjusted under 35 U.S.C. 154(b) by 0 days.

(21) Appl. No.: 09/231,824

(22) Filed: Jan. 15, 1999

(30) Foreign Application Priority Data

Jan. 16, 1998 (IT) ............................................... MI98A0072
Jun. 18, 1998 (IT) ............................................... MI98A1394

(51) Int. Cl.$^7$ .......................... C01B 15/01; C01B 15/023
(52) U.S. Cl. ......................... 423/584; 210/652; 210/654; 423/588; 423/589; 423/590
(58) Field of Search .................. 423/584, 588, 423/589, 590; 210/651, 652, 653, 654

(56) References Cited

U.S. PATENT DOCUMENTS

| | | |
|---|---|---|
| 4,525,265 | 6/1985 | Abe et al. . |
| 4,879,043 | 11/1989 | Boughton et al. . |
| 4,985,228 | 1/1991 | Kirksey . |
| 5,302,367 | * 4/1994 | Signorini et al. .................... 423/589 |
| 5,851,402 | * 12/1998 | Dhalluin et al. ..................... 423/584 |

FOREIGN PATENT DOCUMENTS

| | | |
|---|---|---|
| 0 529 723 A1 | 3/1993 | (EP) . |
| 626 342 A1 | 11/1994 | (EP) . |
| WO 92/06918 | 4/1992 | (WO) . |

OTHER PUBLICATIONS

Abstract of DE 4,214,075; Nov. 16, 1993; Derwent AN=92–416827, (no date).
Abstract of DE 4,222,109; Mar. 03, 1994; Derwent AN=94–016957, (no date).
Abstract of JP 7,109,109; Jul. 12, 1995; Derwent AN=95–190681, (no (no date).

* cited by examiner

Primary Examiner—Wayne Langel
(74) Attorney, Agent, or Firm—Arent Fox Kintner Plotkin & Kahn PLLC

(57) ABSTRACT

Process for the industrial production of hyperpure hydrogen peroxide also having high titre up to 60–70% by weight characterized in that the hydrogen peroxide produced in an industrial plant is directly fed to a purification unit, being part of the same production plant, in which the inverted osmosis, separation of the the high purity permeate flow and direct recycle of the concentrated flow to the production plant, are carried out.

9 Claims, No Drawings

PROCESS FOR THE INDUSTRIAL PRODUCTION OF HIGH PURITY HYDROGEN PEROXIDE

The present invention relates to an industrial process for producing hyperpure hydrogen peroxide also having titre up to about 60–70% by weight, to be used in electronic, pharmaceutical and food industries. Specifically it is used in the electronic field in the semiconductor industry wherein $H_2O_2$ electronic grade is required. The presence of impurities, such as ions, in the commercial hydrogen peroxide requires purification processes so that this product can be used in said industry.

It is well known that hydrogen peroxide as all peroxides requires a precaution series with regard to its industrial production, storage and transport. The safety of these operations is a must on an industrial and commercial scale. An essential characteristic of the commercial hydrogen peroxide is the persistence in the long term of the peroxidic oxygen (active oxygen) content. This quality issue is conventionally characterized as thermal stability, for example by the ISO 7161 test (titre loss after 16 hours at 96° C.).

However the correlation of hydrogen peroxide thermal stability with its purity is not univocal, as the influence of the various impurities, in terms of stability decay, is different and said influence changes also in connection with the distribution of the impurities in their complex.

The thermal stability of the industrial scale hydrogen peroxide is by itself an issue, both for the big volumes of product involved and the importance of the invested capitals, and for the safety warranties required for logistic and transport purposes. This issue becomes much more critical when $H_2O_2$ titre reaches values up to about 60–70% by weight.

The chemical industry solves this problem as follows: on one side, by the careful selection of the technical materials in contact with hydrogen peroxide—the production plants are made with aluminum or stainless steel; the storage tanks with stainless steel or with special plastic materials—; on the other side, by adding to hydrogen peroxide specific chemical products which are able to improve the thermal stability thereof also by the inhibition of chemical agents able to catalyze any product decomposition reactions.

Practically to obtain hyperpure hydrogen peroxide it is necessary to start from commercial stabilized hydrogen peroxide and to process it by means of extreme purification processes to remove the impurities which are not acceptable in the indicated applications, for example in the electronic industry.

The purification processes of the hydrogen peroxide for the removal of various polluting agents are known in the art. However all the known prior art purification processes are carried out in a small scale and the output in purified product is very limited. The ratio of the output product with respect to the input is very low, well below 20%, in the process of reverse osmosis of the prior art.

All these processes use as starting material commercial grade stabilized $H_2O_2$ (see U.S. Pat. No. 4,879,043).

To reach a higher purity level, that is necessary for high purity applications, it is necessary to retreat the purified product. The disadvantage is that the yield in purified product is even lower. From the industrial point of view this is a great disadvantage.

In particular see the patents having as an object the treatment of hydrogen peroxide by reverse osmosis, U.S. Pat. No. 4,525,265; U.S. Pat. No. 4,879,043; the patents relating to the purification of hydrogen peroxide by treatment with ions exchange resins, WO 92/06918; DE 4,214,075; the patents describing the purification processes of hydrogen peroxide which are carried out by mixed techniques JP 7,109,109; U.S. Pat. No. 4,985,228; EP 626,342; DE 4,222,109.

The combination of different indicated techniques, necessary in order to obtain high purity hydrogen peroxide which is therefore free from all the polluting agents, until the analytical detectability, must fully comply with operating safety criteria. This safety is however compromised by the lack of the chemical stabilizers of the product. Obviously the relevance of this problem increases with the production scale. Moreover, this problem becomes more critical as the concentration of the produced hydrogen peroxide reaches about 60–70% titre.

Therefore the obtainment of hydrogen peroxide at increasing purity levels in industrial amounts is an open technological problem. The more, when its concentration is as high as about 60 to 70% titre.

Moreover another drawback of the processes of the art is that the purified product yields are not high and the processing duration of the ions exchange resins is very short. Besides, the risk due to a prolonged use of said resins is very high. Moreover the amount of hydrogen peroxide containing impurities which requires specific treatments for its disposal is considerable; this requires treatment plants of remarkable sizes with consequent increase of the purification costs.

It was felt the need to have available an industrial process to produce hyperpure hydrogen peroxide also having high concentration, up to about 60–70% by weight (titre), which neither implies risks from the safety point of view nor implies the above mentioned disadvantages.

The Applicant has surprisingly and unexpectedly found that it is possible to obtain on industrial scale hydrogen peroxide also at high concentration up to about 60–70% by weight with the purity levels required by the most sophisticated applications with the process described hereinafter.

An object of the present invention is an industrial process for the production of hyperpure hydrogen peroxide also at high concentration, up to about 60–70% by weight, characterized in that the hydrogen peroxide produced in an industrial plant, and used as such without addition of any stabilizing agent, also at high concentration up to about 60–70% by weight is directly fed to a purification unit, being part of the same production plant, in which the reverse osmosis, separation of the high purity permeate flow and direct recycle of the concentrated flow to the production plant, are carried out.

The osmosis is carried out in one or more steps in series or in parallel, with direct recycle of the concentrated flow to the production plant of the hydrogen peroxide, preferably to the final distillation unit. The membranes used to carry out the reverse osmosis are based on polyamides, polypiperazinamides, polyacrylonitrile and polysulphones.

Preferably the purification process of the invention comprises also a treatment unit based on ions exchange resins for the above mentioned permeate, in order to obtain hydrogen peroxide with even higher purity levels. It has been indeed surprisingly found that the product coming out from the osmosis units has very high stability characteristics and can be further treated as hereabove indicated with the utmost safety.

If desired, one or more units charged with ions exchange resins in series or in parallel can be used.

The ions exchange resins are preferably of strong cationic type. Amberlite 200C and Amberjet 1500H by Rohm & Haas can for example be mentioned.

If desired, the process of the invention can comprise ultrafiltering/nanofiltering units to remove the particles that may be possibly present in the hydrogen peroxide. This step is generally inserted before the reverse osmosis unit and optionally also after the osmosis unit or the treatment with resin.

Also for the ultrafiltering one or more units in series or in parallel can be used.

By the process of the invention it has been achieved the possibility to integrate the purification unit with the hydrogen proxide industrial producing units, in the full compliance with the industrial fixed criteria of the risk control.

Thus there are no scale limitations in the production of hyperpure hydrogen peroxide with respect to the current production of technical grade hydrogen peroxide. This is a remarkable advantage of the process of the invention in comparison with the processes of the art since it allows to solve the economic conflicts in their whole.

It has been found that by the invention process the absence of chemical additives acting as stabilizers not only does not compromise the operating safety or the stability of the obtained product (TEST ISO 7161), but it also allows to obtain the desired purity levels with very good economic efficiency, since product purgings are not necessary, the concentrated flow coming from the osmosis unit being directly reintegrated in the production cycle.

In the invention process the absence of massive polluting agents (stabilizers) in the crude product fed to the purification line comprising the reverse osmosis units, and optionally the units of the treatment with resins, optionally interposing an ultrafiltering/nanofiltering unit, allows to obtain the best desired purity levels in an economic and safe way. It has indeed been found that neither the reverse osmosis units are deactivated, nor depositions of impurities able to destabilize the hydrogen peroxide occur on the ionic eschange resins, nor agents external to the industrial production process of hydrogen peroxide are introduced in the production cycle, nor external polluting agents come into contact with the product which can be treated in line, in closed circuits. This represents a further advantage in comparison with the processes of the art and allows to obtain higher permeate yields compared with the prior art processes.

The intrinsic safety of the purification process of the invention allows the integration thereof in the hydrogen peroxide industrial production plants, without increasing their total operating risk. The Applicant has surprisingly found that this safety is maintained also when $H_2O_2$ having high titre, for example up to about 60–70% by weight, is processed.

This fact, together with the high yields resulting from the absence of purgings in the integrated cycle, makes the invention process particularly advantageous from the economic point of view.

The examples reported hereinafter have the only purpose to illustrate, without anyway limiting it, the process object of the present invention.

EXAMPLE 1

A 650 l/h flow of technical grade Hydrogen Peroxide, (not containing stabilizing agent) of industrial quality as shown in the analysis in Table 1, column 1, extracted from a continuous distillation column, was uninterruptedly fed for 5 days to a purification unit formed by a filtering cartridge (ultrafiltering unit) and by a reverse osmosis modulus, operated at a pressure of 20 bar and at the temperature of 20° C.

A 350 l/h flow of purified Hydrogen Peroxide was obtained, of average quality as shown by the analysis in Table 1, column 2, and a complementary flow of 300 l/h of crude Hydrogen Peroxide was recycled as such, directly to the continuous distillation unit.

EXAMPLE 2

A 650 l/h flow of crude Hydrogen Peroxide of Example 1 was uninterruptedly fed for 10 days to a purification unit formed by a couple of reverse osmosis moduli, placed in series, by operating at a pressure of 20 bar and at the temperature of 25° C.

A 200 l/h flow of purified Hydrogen Peroxide was obtained, of average quality as shown by the analysis in Table 1, column 3, and a complementary flow of 450 l/h of crude Hydrogen Peroxide was recycled as such, directly to the continuous distillation unit.

EXAMPLE 3

A 60 l/h flow of purified Hydrogen Peroxide of Example 2 was uninterruptedly fed for 24 hours to a purification unit constituted by a strong cationic resin Amberjet 1.500H dispersed bed, in acidic form, with a 300 $h^{-1}$ space speed, and operated at atmospheric pressure and at the temperature of 5° C., followed by a nanofiltering unit.

A 35 l/h flow of purified Hydrogen Peroxide was obtained, of average quality as shown by the analysis in Table 1, column 4.

TABLE 1

| | column 1 | column 2 | column 3 | column 4 |
|---|---|---|---|---|
| titre, % w/w | 35.1 | 35.1 | 35.1 | 35.1 |
| stability ISO 7161 | 4 | 0.3 | 0.05 | 0.05 |
| pH | 3.5 | 3.5 | 3.5 | 3.5 |
| TOC (ppm) | 170 | 16 | 8 | |
| Al (ppb) | 450 | 11 | 1.2 | 0.50 |
| Cr (ppb) | 6 | <0.5 | 0.14 | 0.08 |
| Mn (ppb) | | | 0.02 | 0.01 |
| Co (ppb) | | | 0.01 | 0.01 |
| Ni (ppb) | | | 0.17 | 0.04 |
| Cu (ppb) | | | 0.43 | 0.04 |
| Zn (ppb) | | | 0.57 | 0.08 |
| As (ppb) | | | 0.01 | 0.01 |
| Sn (ppb) | | | 0.01 | 0.01 |
| Mo (ppb) | | | 0.01 | 0.01 |
| W (ppb) | | | 0.23 | 0.02 |
| Cd (ppb) | | | 0.01 | 0.01 |
| Bi (ppb) | | | 0.01 | 0.01 |
| Pb (ppb) | | | 0.69 | 0.01 |
| Ti (ppb) | | | 0.56 | 0.03 |
| Fe (ppb) | 10 | <0.5 | 0.75 | 0.09 |
| Mg (ppb) | | | 0.88 | 0.08 |
| Ca (ppb) | | <50 | 3.0 | 0.09 |
| Sr (ppb) | | | 0.57 | 0.01 |
| Ba (ppb) | | | 0.2 | 0.02 |
| Na (ppb) | 48 | <10 | 4.1 | 0.07 |
| K (ppb) | | | 2.1 | 0.08 |
| $PO_4$ (ppm) | 7 | <0.1 | <0.05 | <0.05 |
| $P_2O_7$ (ppm) | | | <0.05 | <0.05 |
| $SO_4$ (ppm) | | <0.1 | <0.05 | <0.05 |
| Cl (ppm) | 0.5 | <0.1 | <0.05 | <0.05 |
| $NO_3$ (ppm) | 3 | <0.1 | <0.05 | <0.05 |

EXAMPLE 4

A 1900 l/h flow of hydrogen peroxide (not containing stabilizing agent) having a 59.8% w/w titre, of industrial quality (sodium ion content of 2150 ppb) extracted from a continuous distillation column, was uninterruptedly fed for 6 days to a purification unit consisting of a reverse osmosis unit, constituted by a spiral wound membrane of composite polyamide (8040-HSY-SWC1 model by Hydranautics), operated at 40 bar pressure and at the temperature of 20° C.

A 900 Kg/h flow of purified hydrogen peroxide, having a 59.8% titre, of average quality as shown by the analysis in Table 2, column 1, was obtained and a complementary 1000 l/h flow of crude hydrogen peroxide was recycled as such, directly to the distillation unit.

EXAMPLE 5

A 2300 l/h flow of purified hydrogen peroxide of Example 4 having a 59.8% w/w titre, of average quality as shown by the analysis in Table 2, column 1, was uninterruptedly fed for 3 days to a purification unit formed by a filtering cartridge (ultrafiltering unit) and by a reverse osmosis unit of Example 4, working at 40 bar pressure and at the temperature of 20° C.

A 1300 l/h flow of purified hydrogen peroxide, having a 59.8% titre of average quality as shown by the analysis in Table 2, column 2, was obtained and a complementary 1000 l/h flow of crude hydrogen peroxide was recycled as such, directly to the distillation unit.

EXAMPLE 6

A 2000 kg/h flow of hydrogen peroxide having a 69.9% titre, (not containing stabilizing agent) of industrial quality (sodium ion content of 2150 ppb) was uninterruptedly fed for 3 days to the purification unit of Example 5, by operating at a 20 bar pressure and at the temperature of 20° C.

A 950 l/h flow of purified hydrogen peroxide, having a 69.9% titre of average quality as shown by the analysis in Table 2, column 3, was obtained and a complementary 1050 l/h flow of crude hydrogen peroxide was recycled as such, directly to the industrial distillation unit.

TABLE 2

|  |  | column 1 | column 2 | column 3 |
|---|---|---|---|---|
| Titre (% w/w) |  | 59.8 | 59.8 | 69.9 |
| Total carbon | (ppm) | 14 | 6 | 16 |
| Chlorides | (ppb) | 55 | <10 | 62 |
| Nitrates | (ppb) | 200 | 85 | 225 |
| Phosphates | (ppb) | <50 | <10 | <50 |
| Sulphates | (ppb) | <50 | <10 | <50 |
| Arsenic | (ppb) | <5 | <1 | <5 |
| Aluminum | (ppb) | <5 | <1 | <5 |
| Barium | (ppb) | <5 | <1 | <5 |
| Berillium | (ppb) | <5 | <1 | <5 |
| Bismuth | (ppb) | <5 | <1 | <5 |
| Cadmium | (ppb) | <5 | <1 | <5 |
| Calcium | (ppb) | <10 | <1 | <10 |
| Chromium | (ppb) | <5 | <1 | <5 |
| Cobalt | (ppb) | <5 | <1 | <5 |
| Copper | (ppb) | <5 | <1 | <5 |
| Gallium | (ppb) | <5 | <1 | <5 |
| Iron | (ppb) | <5 | <1 | <5 |
| Magnesium | (ppb) | <5 | <1 | <5 |
| Manganese | (ppb) | <5 | <1 | <5 |
| Molibdenum | (ppb) | <5 | <1 | <5 |

TABLE 2-continued

|  |  | column 1 | column 2 | column 3 |
|---|---|---|---|---|
| Nickel | (ppb) | <5 | <1 | <5 |
| Lead | (ppb) | <5 | <1 | <5 |
| Silver | (ppb) | <5 | <1 | <5 |
| Sodium | (ppb) | 53 | <5 | 66 |
| Strontium | (ppb) | <5 | <1 | <5 |
| Tallium | (ppb) | <5 | <1 | <5 |
| Tin | (ppb) | <5 | <1 | <5 |
| Vanadium | (ppb) | <5 | <1 | <5 |
| Zinc | (ppb) | <5 | <1 | <5 |

What is claimed is:

1. A process for the industrial production of hyperpure hydrogen peroxide having a titre up to about 60–70% by weight comprising:

directly feeding hydrogen peroxide, void of stabilizing agent, generated from a production plant to a purification unit as part of the same production plant, subjecting the hydrogen peroxide to reverse osmosis, separating high purity permeate flow, and directly recycling concentrated hydrogen peroxide to the production plant, thereby producing hyperpure hydrogen peroxide having a titre up to about 60–70% by weight.

2. A process for the production of hyperpure hydrogen peroxide according to claim 1, wherein said reverse osmosis is carried out in one or more steps placed in series or in parallel, with direct recycle of the concentrated hydrogen peroxide to a final distillation unit of the hydrogen peroxide plant.

3. A process for the production of hyperpure hydrogen peroxide according to claim 1, wherein membranes used to carry out said reverse osmosis are made of polyamides, polypiperazinamides, polyacrylonitrile, or polysulphones.

4. A process for the production of hyperpure hydrogen peroxide according to claim 1, wherein the purification unit includes a unit of ion exchange resins.

5. A process for the production of hyperpure hydrogen peroxide according to claim 4, wherein the ion exchange resins are cationic.

6. A process for the production of hyperpure hydrogen peroxide according to claim 1, wherein also an ultrafiltering/nanofiltering unit is present.

7. A process for the production of hyperpure hydrogen peroxide according to claim 6, wherein the ultrafiltering/nanofiltering unit is inserted before the osmosis unit and optionally also after the osmosis unit or the unit of ion exchange resins.

8. A process for the production of hydrogen peroxide according to claim 1 in which the hydrogen peroxide has a titre of about 60% by weight.

9. A process for the production of hydrogen peroxide according to claim 1 in which the hydrogen peroxide has a titre of about 70% by weight.

* * * * *